US008834173B2

(12) United States Patent
McKinley et al.

(10) Patent No.: US 8,834,173 B2
(45) Date of Patent: Sep. 16, 2014

(54) METHOD AND SYSTEM FOR SCRIPTED TESTING

(75) Inventors: Robert L. McKinley, Coralville, IA (US); Nancy S. Petersen, Solon, IA (US); Judith A. Spray, Iowa City, IA (US)

(73) Assignee: Act, Inc., Iowa City, IA (US)

( * ) Notice: Subject to any disclaimer, the term of this patent is extended or adjusted under 35 U.S.C. 154(b) by 1068 days.

(21) Appl. No.: 11/102,016

(22) Filed: Apr. 8, 2005
(Under 37 CFR 1.47)

(65) Prior Publication Data
US 2006/0228686 A1    Oct. 12, 2006

(51) Int. Cl.
*G09B 3/00*    (2006.01)
*G09B 7/00*    (2006.01)

(52) U.S. Cl.
CPC .......................................... *G09B 7/00* (2013.01)
USPC .......................................................... 434/322

(58) Field of Classification Search
USPC .......................................... 434/323, 322, 350
See application file for complete search history.

(56) References Cited

U.S. PATENT DOCUMENTS

| | | | | |
|---|---|---|---|---|
| 5,059,127 A | * | 10/1991 | Lewis et al. | 434/353 |
| 5,565,316 A | * | 10/1996 | Kershaw et al. | 434/322 |
| 5,657,256 A | * | 8/1997 | Swanson et al. | 702/119 |
| 5,841,655 A | * | 11/1998 | Stocking et al. | 700/83 |
| 6,000,945 A | * | 12/1999 | Sanchez-Lazer et al. | 434/322 |
| 6,431,875 B1 | * | 8/2002 | Elliott et al. | 434/322 |
| 6,606,479 B2 | | 8/2003 | Cook et al. | |
| 6,652,283 B1 | | 11/2003 | Van Schaack et al. | |
| 6,688,889 B2 | | 2/2004 | Wallace et al. | |
| 6,704,741 B1 | * | 3/2004 | Lively et al. | 1/1 |
| 2002/0160347 A1 | | 10/2002 | Wallace et al. | |
| 2002/0192629 A1 | | 12/2002 | Shafrir | |
| 2003/0138765 A1 | | 7/2003 | Bowers | |
| 2005/0125196 A1 | * | 6/2005 | Swanson | 702/182 |
| 2005/0186551 A1 | * | 8/2005 | Belov | 434/323 |

OTHER PUBLICATIONS

Davey, Tim, "An Introduction to Bin-Structured Adaptive Testing", annual meeting of National Council on Measurement in Education (NCME) Apr. 2005, Montreal, Canada.
Jodoin, Michael G., "Developing Bin-Structured Item Pools", annual meeting of American Educational Research Association, Apr. 15, 2005, Montreal, Canada.
Robin, Frédéric, "A Comparison of Conventional and Bin-Structured Computerized Adaptive Tests", annual meeting of American Educational Research Association, Apr. 13, 2005, Montreal, Canada.

* cited by examiner

*Primary Examiner* — Robert J Utama
(74) *Attorney, Agent, or Firm* — McKee, Voorhees & Sease

(57) ABSTRACT

A method and system for assembling a test having a plurality of slots is disclosed. The method includes executing a test administration script to associate each of the plurality of slots of the test with an item collection from which an item to fill the slot is to be chosen and to determine a lookup table of optimization statistics and a degree of randomization to use in selecting items from the item collection. An interim test score is obtained based on a portion of the test previously assembled. Optimization statistics are applied to control a property of the test based on the interim score while taking into account the degree of randomization.

18 Claims, 3 Drawing Sheets

METHOD AND SYSTEM FOR SCRIPTED TESTING

I. BACKGROUND OF THE INVENTION

Figure 1:
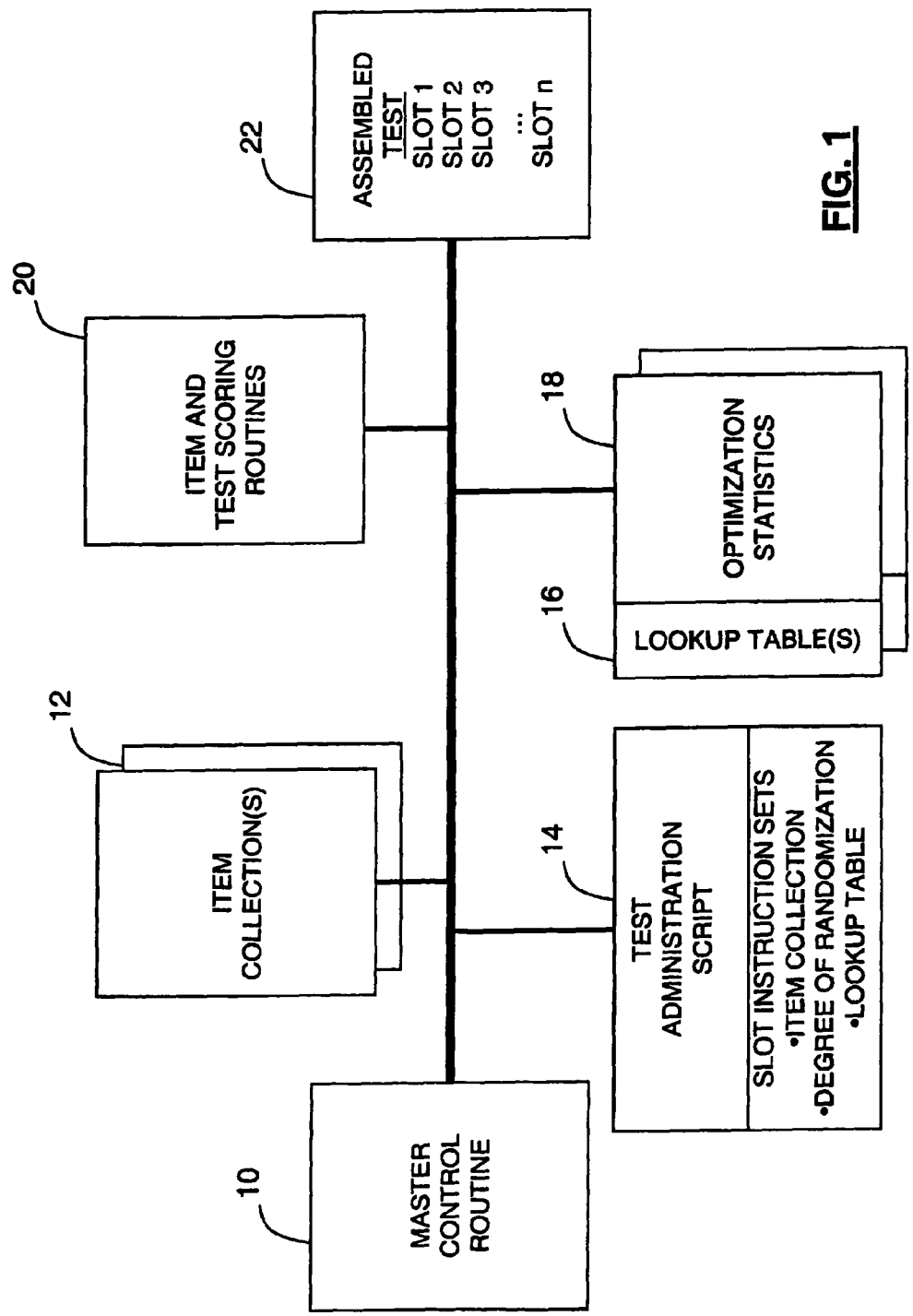

The present invention relates to the development of tests to meet test specifications. More specifically, but not exclusively, the present invention relates to methods and systems for the selection of items for inclusion in a test in order to meet test specifications.

A test specification is a set of content and statistical requirements designed to ensure the validity, reliability, and fairness of test scores. Regardless of whether the test is a computer-adaptive test (CAT) or a traditional pencil and paper test, there are a number of key concerns for developing a test to meet the test specifications. With respect to the selection of items (questions) to administer, key concerns include test content, test reliability, test validity, test security, and test item usage. Test content relates to the subject matter and skill coverage of the test. Test validity relates to the appropriateness of the score interpretations proposed for the test. Test reliability relates to the accuracy of the test or the consistency of scores. Test security relates to the likelihood that an examinee taking a particular test would have previously seen test items. Test item usage relates to the proportion of available test items actually administered to examinees and to the frequency with which an item is administered to examinees.

Test specifications include a set of content and statistical requirements designed to ensure the validity, reliability, and fairness of test scores. Typical prior art attempts at meeting the specifications for a test include application of complex, stochastic processes that treat content, statistical, and item usage concerns simultaneously through a method known as the weighted deviations model. Because the weighted deviations model is a stochastic process, it only assures that test statistical, content, and security requirements are met in probability, which is to say on average. Thus, a likelihood remains that individual test takers may receive tests that do not conform to either test content specifications or test statistical specifications. Furthermore, because the weighted deviations model, as typically implemented, confounds content and information in the selection of items, and information is not distributed evenly over content categories, highly discriminating items become over-exposed without any concomitant benefit in measurement precision. Therefore, there are problems with typical prior art.

Therefore, it is a primary object, feature, or advantage of the present invention to improve upon the state of the art.

It is another object, feature, or advantage of the present invention to provide a method and system for selecting items in a manner that meets key goals of test assembly including test content, test validity, test reliability, test security, and test item usage.

Yet another object, feature, or advantage of the present invention is to meet the key goals of test assembly by separating the process for meeting test content from that for meeting test statistical and item usage specifications.

A further object, feature, or advantage of the present invention is to eliminate the stochastic elements of the test assembly process and make the content representation deterministic.

A still further object, feature, or advantage of the present invention is to ensure that all test takers receive the correct content representation.

Another object, feature, or advantage of the present invention is to provide for a deterministic content representation such that it becomes possible to make extremely accurate item development needs forecasts.

Yet another object, feature, or advantage of the present invention is to replace the weighted deviations model by using an item selection process that seeks to equalize usage over items without compromising the precision with which scores are measured.

A further object, feature, or advantage of the present invention is to insure that all items within an item collection associated with a slot are available for selection some portion of the time.

A still further object, feature, or advantage of the present invention is to increase the number of items within an item pool actually being administered and reduce the usage for any given item.

Another object, feature, or advantage of the present invention is to provide a method and system for selecting items for inclusion in a test that allows for assembly of either linear or adaptive computer-based tests.

One or more of these and/or other objects, features, or advantages of the present invention will become apparent from the specification and claims that follow.

II. SUMMARY OF THE INVENTION

The present invention provides for selecting items to include in a test in a manner that meets test requirements such as those concerning the content, validity, reliability, and fairness of test scores. The test includes a number of slots to be filled. Each slot is filled with a test item, which can be a test question or a set of associated test questions. These test items are selected from one or more collections of items.

As part of the test assembly process, test development staff specifies content requirements for each slot in the test. One or more slots in a test may have the same content constraints. An item collection then comprises all of the available items, or sets, considered eligible for use for a particular slot in the test. Thus, if it were desired that the first item appearing in every test be of type x, then all items in the item collection specified for slot one must be of type x. Since all items and/or sets will be drawn from one or another of the item collections for a test, the collections must be exhaustive.

In order to fill the slots of the test with test items, a test administration script is used. In one embodiment, the test administration script specifies for each slot the item collection from which the item is to be selected. The test administration script also specifies for each slot a lookup table of optimization statistics and a degree of randomization to be used in item selection. An interim test score is taken into account. The selection of items is guided by the use of optimization statistics so those items that are consistent with the test statistical requirements are selected. For an adaptive test the optimization statistics would typically correspond to any of a wide range of minimization or maximization functions, including but not limited to matching item difficulties to interim scores, maximizing item information at the interim score, or minimizing the posterior variance of the interim score. For linear tests, except in the case of mastery testing, they would more commonly represent, but would not be limited to, discrepancies of interim, achieved test level curves from test level target curves such as a target test information curve or a target test characteristic curve. In the case of mastery testing, they would more commonly correspond to, but would not be limited to, maximizing item information at the cut-score.

One of the main benefits of the present invention is that it meets the key goals of test assembly by separating the process for meeting test content from that for meeting test statistical and item usage specifications. Thus, the present invention allows the stochastic elements of the test assembly process to be eliminated and makes the content representation deterministic, which not only ensures that all test takers receive the correct content representation but also makes it possible to make extremely accurate item development needs forecasts.

According to another aspect of the invention, the use of a weighted deviations model for item selection is replaced with the use of an item selection process that seeks to equalize usage over items without compromising the precision with which scores are measured. The weighted deviations model selects the next item to be administered from the available items based on both the content constraints satisfied and maximum information. The item with the most information that will meet the most highly weighted content constraints is selected. Consequently, the most highly discriminating items tend to be over-selected. Since content is deterministic for each slot in the test, the present invention can select the next item to be administered at random from the n items within the current slot that will contribute most to the statistical criteria for the test. By adding a degree of randomization to the selection process, it is possible to insure that all items within an item collection associated with a slot are available for selection some portion of the time, resulting in more items within the pool actually being administered and reduced usage for any given item.

III. BRIEF DESCRIPTION OF THE DRAWINGS

FIG. 1 is a block diagram providing an overview of one embodiment of a system of the present invention.

Figure 2A:
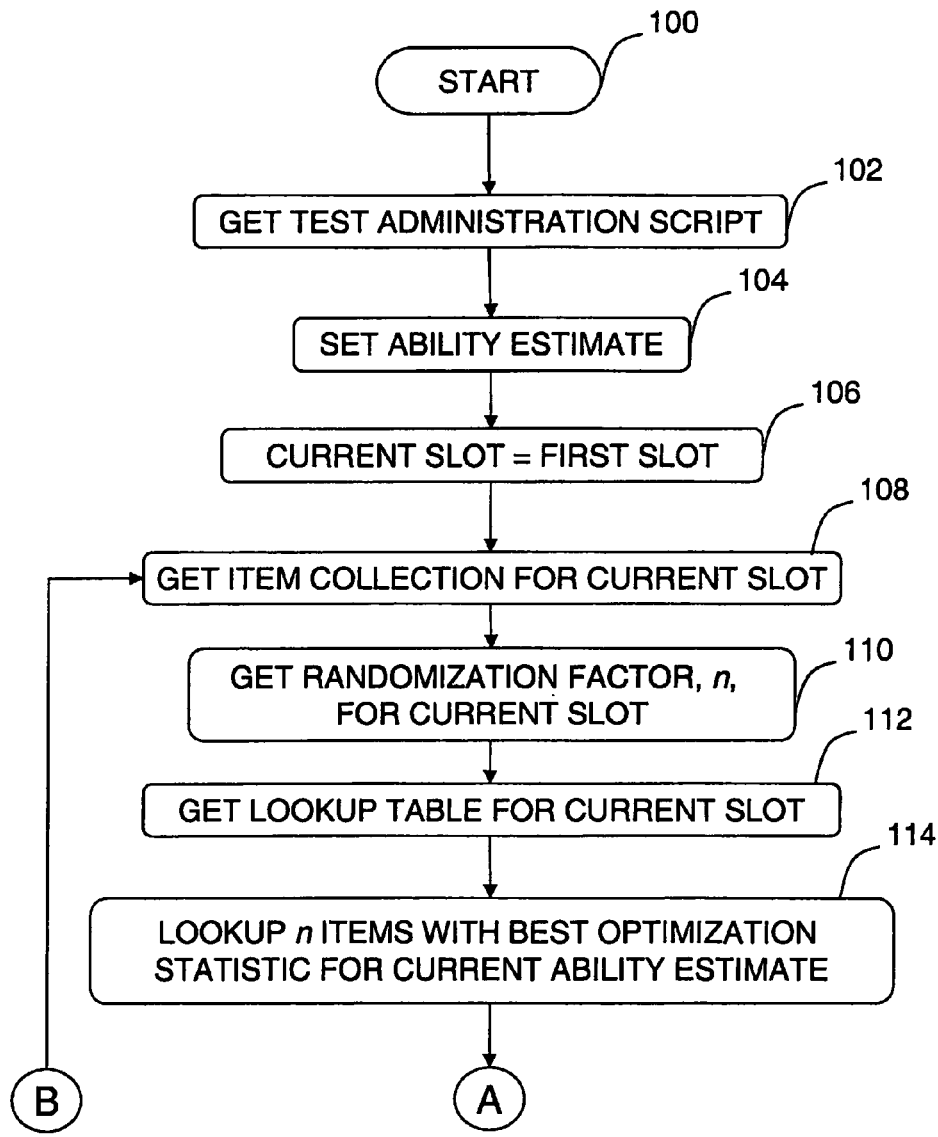
Figure 2B:
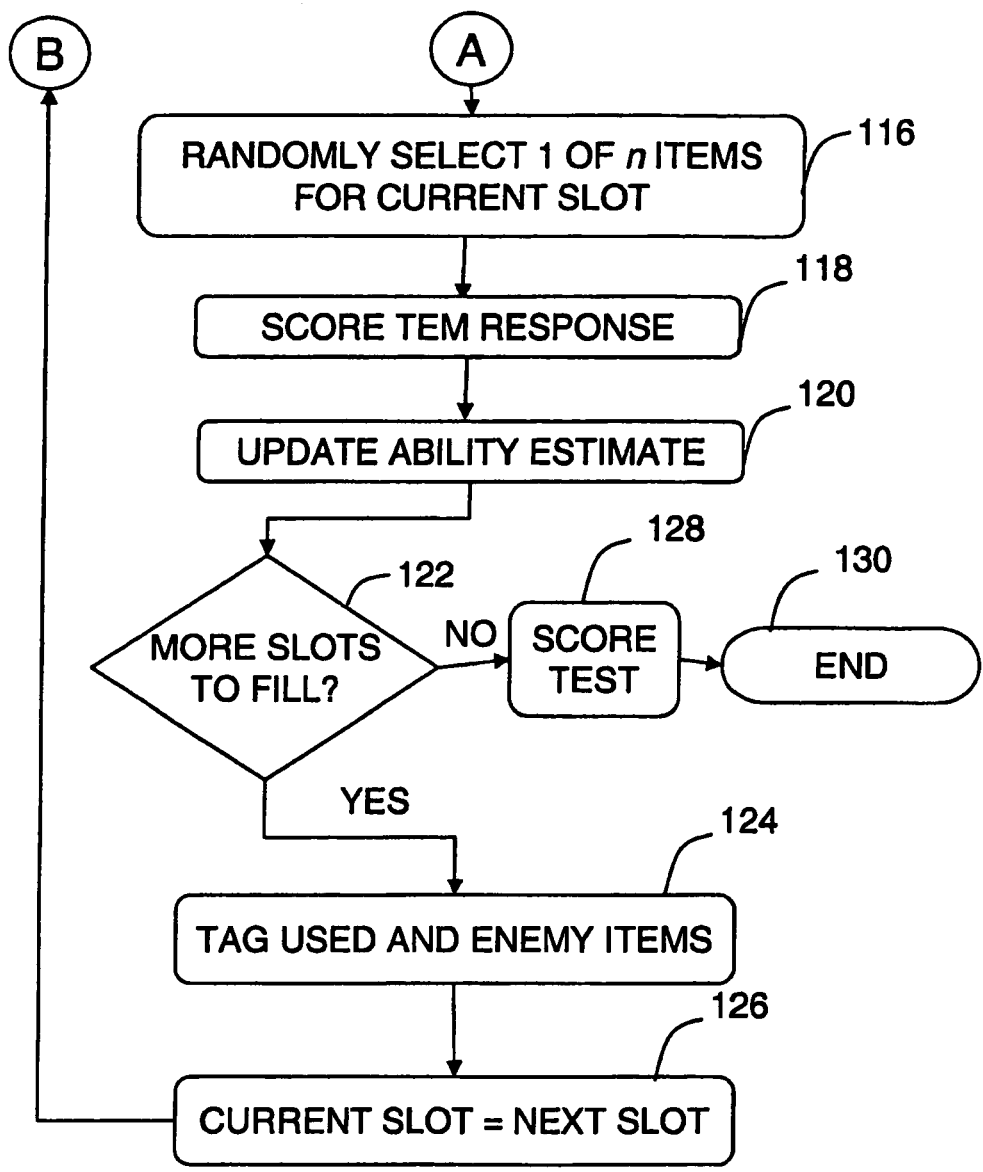

FIGS. 2A and 2B provide a flow chart illustrating one embodiment of the methodology of the present invention.

IV. DETAILED DESCRIPTION OF THE PREFERRED EMBODIMENT

The present invention provides for selecting items to include in a test in a manner that meets content and statistical specifications associated with the test. In order to do so, the present invention uses a test administration script in combination with item collections, optimization functions, and a degree of randomization to determine the item to place within a slot of a test.

Scripted testing comprises four primary components—a set of one or more item collections, a set of one or more lookup tables of optimization statistics, item and test scoring routines, and a test administration script (TAS). The TAS is the mechanism by which the desired design is imposed on the test. It consists of a series of instruction sets, one for each slot in the test, identifying for that slot the item collection from which the item for that slot is to be chosen and the lookup table of optimization statistics and the degree of randomization to be employed in that selection.

FIG. 1 illustrates one embodiment of a system of the present invention. The various components shown in FIG. 1 are used to assemble a test. The master control routine 10 interacts with one or more of the other components, which include item collection(s) 12, a test administration script 14, lookup table(s) 16 of optimization statistics 18, and item and test scoring routines 20, to produce an assembled test 22. The assembled test 22 includes a number of slots that contain appropriately selected items from the item collection(s) 12. The test administration script 14 is the mechanism by which a desired design is imposed on the test. The test administration script 14 includes a series of instruction sets, one for each slot in the test, identifying for each slot the item collection from which the item for that slot is to be chosen and the lookup table and degree of randomization to be used in that selection.

A. Scripted Testing

Simplified Example

A simplified example of one embodiment of the present invention is described below. The present invention is not to be limited to this particular embodiment, as one skilled in the art having the benefit of this disclosure would understand numerous variations and modifications that can be performed.

FIGS. 2A and 2B illustrate an overview of one method for scripted testing. The method shown in FIGS. 2A and 2B is used to assemble a test having a plurality of slots to be filled with test items. In step 100 of FIG. 2A, the process begins with selection of a test administration script in step 102. In step 104, an initial ability estimate is set. The present invention contemplates that the initial ability estimate can be set in various ways, including randomly. Next, in step 106, the current slot is set to be the first slot. For each slot, there is an item collection, a randomization factor, n, and a lookup table of optimization statistics associated with the slot. The item collection is obtained in step 108. The randomization factor is obtained in step 110. The lookup table is obtained in step 112. Then in step 114, the n items with the best optimization statistic for the ability estimate are obtained such as through accessing a lookup table from among those items available for administration in the item collection. Next in step 116 (FIG. 2B), one of the n items is selected for placement in the current slot. In step 118, the examinee's response to the item is scored. In step 120, the ability estimate for the examinee is updated. If there are additional slots to fill in step 122, then the last administered item and enemy items associated with that item are tagged as unavailable for selection in step 124. Next, in step 126 the current slot is incremented. The process then returns to step 108 (FIG. 2A) for obtaining the item collection associated with the next slot. If in step 122 there are no more slots to fill in order to assemble the test, then in step 128 the test is scored and the process ends at step 130.

1. Definitions

The following definitions are pertinent to the discussion that follows below. For purposes of explanation, some of the terminology used in describing the simplified example is defined herein. These terms, to the extent they appear in the claims, are not necessarily limited to the definitions provided herein.

a. Slot. In scripted testing the most fundamental element of testing is the slot. In a test comprising only discrete items, slots correspond to items. Thus a test consisting of 28 discrete items would have 28 slots. However, if a test includes sets of items that must be administered as a block, such as reading passages or testlets, a slot corresponds to the item set rather than the items within the set. Thus, in a 28-item test comprising 16 discrete items and three 4-item sets, there would be a total of 19 slots.

b. Item Collection. In scripted testing, test development staff specifies a priori the content requirements for each slot in the test. An item collection comprises all of the available items, or sets, considered eligible for use for a particular slot in the test. Eligibility for inclusion in a given collection will be determined by content codes. Since all items and/or sets will be drawn from one or another of the item collections for a test, the collections must be exhaustive, but there is no requirement that they be mutually exclusive, as other mechanisms for avoiding redundancy can be put in place. Thus, if it were desired that the first item appearing in every test be of type x, then all items in the item collection specified for slot one must be of type x. That would not preclude the use of type x items in other item collections, however, or even the inclusion of some item collection 1 items in other item collections. In fact, it would be possible to use the same item collection for every slot.

c. Script. In scripted testing, the test administration script is the mechanism by which the content specifications are imposed on the test. It consists of a series of instruction sets, one for each slot in the test, identifying for that slot the item collection from which the item for that slot is to be chosen. Selection from that collection will occur based on two factors, optimization statistics and the degree of randomization imposed for item utilization and security purposes.

For items with equivalent content classifications, the weighted deviations model, in contrast to scripted testing, will tend to select items yielding greater information (i.e., having higher a-values). However, items tend to differ with respect to how many and which content requirements they satisfy, and as a result the advantage of yielding greater information can be offset by a deficit in content, resulting in the selection of an item with a low a-value. For example, consider the following three items:

| Item | Information | Content 1 | Content 2 | Content 3 |
|---|---|---|---|---|
| 1 | 1.2 | X | | |
| 2 | 0.7 | X | X | |
| 3 | 0.3 | X | X | X |

In this example, item 1 yields the greatest information, but only satisfies one content requirement. Item 3, on the other hand, yields little information but satisfies three content requirements. Item two falls in between items 1 and 3, both in terms of information yielded and the number of content requirements satisfied. In this case, if the content requirements were all assigned the same weight, but information was assigned a weight three times as great, so that the weight assigned to information equaled the weight of all of the content requirements combined, the weighted deviations model would select item 1. Item 2 would be somewhat less attractive than item 1, and item 3 would be still less attractive. In general, with this type of weighting scheme items like item 2 would be administered infrequently, and items like item 3 would seldom or never be administered, resulting in over-reliance and over-exposure of items like item 1.

Alternatively, if all four constraints (information, Content 1-Content 3) were assigned the same weight, the weighted deviations model would result in the selection of item 3. Item 2 would be next most attractive, and item 1, which yields the most information, would be least attractive. In general, in these circumstances measurement precision will be compromised for the sake of meeting content requirements.

To the extent that both scenarios occur within the same tests, measurement precision will be compromised at the same time that certain high information items are over-exposed. This cannot happen, however, with scripted testing. In scripted testing, these items would be in different item collections, since they differ with respect to content. The item selection process would occur within such item collections rather than across, and would consider only statistical information. Therefore, the type of unfortunate statistics-content trade-off resulting above could not occur and the desired level of measurement precision could be achieved without compromise.

d. Lookup Table. For item selection purposes, the examinee's most recent ability estimate will be used to enter a lookup table. This table is organized (conceptually, at least) into rows that represent items or sets and columns that represent different ability levels, and it contains tabled values for whatever statistical function is to be optimized during item selection. When an item is to be selected, the optimization statistics from the column representing ability closest to the most recent interim ability estimate are used. From that column, the n available (i.e., unused and non-tagged) items with the best optimization statistics are selected, where n is the randomization factor specified for that slot in the script.

For this simplified example, one lookup table will be used for all slots. This table will contain for each item, at each of several ability levels, optimization statistic. For this simplified example, the optimization function will be the absolute difference between the item's difficulty level and those abilities. In this way the task of selecting the item with the best match of difficulty to ability can be performed simply by scanning a column of numbers in the lookup table to find the items that both belong to the specified item collection and have the smallest numbers in the column. Randomization is then performed by returning from the table with the best n items and then choosing at random from among them.

Note: sometimes the values in the lookup table are referred to as either minimization or maximization statistics. This is because in its most generalized form the algorithm allows almost any optimization function to be used, so long as it can be characterized as either a minimization or maximization problem. The optimization function used need not be the same for all slots in the test. In fact, different lookup tables can be used for every slot.

e. Enemy Item. Enemy items are items that for whatever reason are not to be included on the same test together. This is accomplished by tagging as unavailable all items in a list whenever any item in the list is administered.

f. Scoring Routines. Obviously item scoring requires nothing more than matching the examinee response to an item to the correct answer or key for that item. Beyond this, for the purpose of item selection an updated ability estimate, referred to as an interim ability estimate, will be required after each item or set is administered.

After the last item is administered, the test as a whole is scored. The method used to produce the final test score may or may not be the same as those used to produce the interim ability estimates.

The scripting process itself does not constrain the choice of scoring method, other than requiring that there be one. In fact, scripted testing can just as well be used with a linear computer-based test, with scoring occurring only at the end of the test.

For this simplified example, the maximum likelihood method of scoring is used, both for interim ability estimates and final test scores. To avoid the over-exposure of very hard items in the second slot of the test, as happens with current methods that use information as a criteria for item selection, for test takers with all correct (and all incorrect) responses, for which no maximum likelihood estimate exists, interim scores are increased (decreased) by a fixed step size.

2. Script

For this simplified example, consider a computer-adaptive test (CAT) measuring only arithmetic, algebra, and geometry. Also consider that the CAT is to be six items long, with two items each for the three item types. The script for such a test might look like the table shown below. In this case, item collection 1 contains the arithmetic items, while the algebra items in the pool comprise collection 2 and the geometry items comprise collection 3. Lookup table 1 of optimization statistics will be used to identify the best items for each slot. The n denotes randomly choosing one item to be administered from among the n best items.

| Slot | Content Requirement | Item Collection | Lookup Table | n |
|------|---------------------|-----------------|--------------|---|
| 1 | Arithmetic | 1 | 1 | 2 |
| 2 | Arithmetic | 1 | 1 | 2 |
| 3 | Algebra | 2 | 1 | 2 |
| 4 | Algebra | 2 | 1 | 2 |
| 5 | Geometry | 3 | 1 | 2 |
| 6 | Geometry | 3 | 1 | 2 |

3. Pool

Now, imagine the pool has 15 items in it, five each for the three item types. For simplicity, assume there are no sets. The pool, then, might look something like this.

| Item Number | a-Value | b-Value | c-Value | Item Collection |
|-------------|---------|---------|---------|-----------------|
| 1 | 1.1 | −1.0 | 0.1 | 1 |
| 2 | 0.9 | −0.5 | 0.1 | 1 |
| 3 | 0.7 | 0.4 | 0.1 | 1 |
| 4 | 1.3 | 0.7 | 0.1 | 1 |
| 5 | 1.0 | 1.2 | 0.1 | 1 |
| 6 | 0.6 | 3.0 | 0.1 | 2 |
| 7 | 0.7 | −3.0 | 0.1 | 2 |
| 8 | 1.1 | −2.0 | 0.1 | 2 |
| 9 | 0.8 | 1.8 | 0.1 | 2 |
| 10 | 0.9 | −0.7 | 0.1 | 2 |
| 11 | 1.2 | −0.3 | 0.1 | 3 |
| 12 | 1.1 | 0.1 | 0.1 | 3 |
| 13 | 0.6 | −0.7 | 0.1 | 3 |
| 14 | 0.5 | 0.4 | 0.1 | 3 |
| 15 | 0.8 | 0.0 | 0.1 | 3 |

The item response theory (IRT) discrimination (a), difficulty (b), and pseudo-guessing (c) statistics are not needed for item selection purposes, but they will be required to score this particular test, so they are included here. Not all embodiments of scripted testing would require IRT statistics for scoring.

4. Enemy Items

For the purposes of this example, suppose that test development staff have provided for this pool the following three lists of enemy items.

| Member | Enemy List 1 | Enemy List 2 | Enemy List 3 |
|--------|--------------|--------------|--------------|
| 1 | 1 | 4 | 2 |
| 2 | 2 | 6 | 5 |
| 3 | 7 | 15 | — |
| 4 | 12 | — | — |

Recall that enemy items are items that cannot appear on the same test together, so any time an item appearing in a list is administered, the other items in that list must be tagged as no longer available. Also, bear in mind that an item can appear in more than one list, so the potential number of items disabled by administering an item in the enemy lists is large.

5. Lookup Table

Finally, suppose an item selection statistic lookup table was constructed using three levels of ability ($\theta$), say, −2.0, 0.0, and 2.0. For the purposes of this example, suppose the optimization function used for item selection results in minimization statistics. Assuming the criteria to be minimized were the absolute value of the difference between the most recent ability estimate and the item b-value (i.e., $|\theta-b|$), the look-up table might look something like this.

| Item Number | $\theta = -2$ | $\theta = 0$ | $\theta = 2$ |
|-------------|---------------|--------------|--------------|
| 1 | 1.0 | 1.0 | 3.0 |
| 2 | 1.5 | 0.5 | 2.5 |
| 3 | 2.4 | 0.4 | 1.6 |
| 4 | 2.7 | 0.7 | 1.3 |
| 5 | 3.2 | 1.2 | 0.8 |
| 6 | 5.0 | 3.0 | 1.0 |
| 7 | 1.0 | 3.0 | 5.0 |
| 8 | 0.0 | 2.0 | 4.0 |
| 9 | 3.8 | 1.8 | 0.2 |
| 10 | 1.3 | 0.7 | 2.7 |
| 11 | 1.7 | 0.3 | 2.3 |
| 12 | 2.1 | 0.1 | 1.9 |
| 13 | 1.3 | 0.7 | 2.7 |
| 14 | 2.4 | 0.4 | 1.6 |
| 15 | 2.0 | 0.0 | 2.0 |

Note that item 1 in the pool has a b-value of −1.0, so the absolute differences recorded in the look-up table are computed as:

For $\theta=-2$: $|-2.0-(-1.0)|=1.0$

For $\theta=0$: $|0.0-(-1.0)|=1.0$

For $\theta=2$: $|2.0-(-1.0)|=3.0$, which are the numbers shown in the first row of the table.

6. Scripted Testing Process

Given the above script and tables, the scripting of the test might run something like this.

a. Select at random an initial ability estimate between −1.0 and 1.0, in increments of 0.01. Assume the result was $\theta_0=-0.27$.

b. The script for slot 1, the beginning of the test, says to use lookup table 1 to select the two best items for the most recent ability estimate from items in collection 1 (i.e., items 1-5), then randomly choose one of those two items to administer. This is done as follows.

1. Find the lookup table column for the ability level closest to $\theta_0$, which in this case would be the column for $\theta=0.0$.
2. In this column, find the two items from item collection 1 with the smallest values of the minimization statistic. The item collection 1 items, sorted from smallest value to largest, are 3, 2, 4, 1, and 5. The best two, then, would be items 2 and 3.
3. Select at random from among these two items. Say the result was that item 2 was selected.
4. Assume item 2 was administered, answered correctly and the partial test scored, resulting in a new ability estimate, $\theta_1=1.73$. This ends the processing for slot 1.
5. At this point item 2 is tagged as used and no longer available. Any items appearing with it in an enemy item list must also be tagged as no longer available. In this case, that would include items 1, 5, 7, and 12.
6. For slot 2, another item is required from item collection 1. However, this must be an item selected at random from the best two items using the minimization statistics in the third column of the lookup table, the values for $\theta=2.0$, the tabled ability level that is closest to $\theta_1=1.73$.

7. The items from collection 1 sorted from best to worst are now 5, 4, 3, 2, and 1. Item 2, of course, is no longer eligible since it has already been administered. Because they appear with item 2 in an enemy item list, at this point items 1 and 5 are also no longer available. Thus, the best two items available at this ability level are now 4 and 3. In fact, at this point they are the only items available for selection.

8. Assume item 4 was selected, administered, answered incorrectly, and the partial test scored, resulting in a new ability estimate of $\theta_2 = -0.20$. This ends the processing for slot 2.

9. At this point item 4 is tagged as used and no longer available. Any items appearing with it in an enemy item list must also be tagged as no longer available. In this case, that would include items 6 and 15.

10. The script now takes us to item collection 2 for the next two items, so steps 1-9 above would be repeated using items from that collection. That would complete processing for slots 3 and 4.

11. The same process would then be followed for slots 5 and 6, which would involve the items from collection 3.

12. The test would then be scored and this would complete the test.

It should be understood that the present invention is not to be limited to this simplified example. One skilled in the art having the benefit of this disclosure will be able to apply the present invention to a variety of testing situations in a variety of manners.

B. Other Embodiments and Variations

The present invention is not to be limited to the particular embodiment described herein. In particular, the present invention contemplates numerous variations in the type of test, whether the test is a linear or adaptive computer-based test. The present invention contemplates variations in the particular properties used in order to meet a given test specification. The present invention contemplates that an optimization function may or may not be used and where used can vary for each slot. The present invention contemplates that scoring can be accomplished in various ways and that the scoring processes used to produce interim ability estimates may or may not be the same as the process used to produce the final score on the test. One skilled in the art having the benefit of this disclosure will understand that there are numerous other variations of the present invention not articulated herein, but nevertheless within the spirit and scope of the invention.

What is claimed is:

1. A computer-assisted method of test assembly for assembling a test comprised of a plurality of slots to be filled by test items, the method comprising:
   providing a plurality of item collections, each of the plurality of item collections comprising a plurality of test items;
   executing a test administration script to associate each of the plurality of slots of the test with one of the plurality of item collections from which an item to fill the slot is to be selected, the one of the plurality of item collections including a plurality of eligible text items that meet the content specifications for that slot of the test, and wherein the test administration script comprises a plurality of instruction sets, one of the instruction sets associated with one of the plurality of slots;
   obtaining an interim test score based on examinee responses to a portion of the test previously assembled and administered to an examinee;
   further executing the test administration script to apply, using a computer, an optimization process and randomization factor to select the item to fill the next slot of the test while controlling statistical properties of the test based on the interim score and properties of the items within the item collection associated with each of the plurality of slots; and
   repeating the steps of obtaining the interim test score and applying the optimization process until the test has been completely assembled and administered to the examinee;
   wherein execution of the test administration script ensures the test meets a content specification while reducing the computational load required to assemble the test.

2. The computer-assisted method of claim 1 wherein the step of obtaining an interim score includes assigning an initial score as the interim score for a first of the plurality of slots.

3. The computer-assisted method of claim 1 wherein the test is a computer adaptive test.

4. An article of software stored on a non-transitory computer readable storage medium comprising instructions for performing a method of test assembly for assembling a test comprised of a plurality of slots to be filled by test items, the method comprising:
   providing a plurality of item collections, each of the plurality of item collections comprising a plurality of test items;
   executing a test administration script to associate each or the plurality of slots of the test with one of the plurality of item collections from which an item to fill the slot is to be selected, the one of the plurality of item collections including a plurality of eligible text items that meet the content specifications for that slot of the test, and wherein the test administration script comprises a plurality of instruction sets, one of the instruction sets associated with one of the plurality of slots;
   obtaining an interim test score based on examinee responses to a portion of the test previously assembled and administered to an examinee;
   further executing the test administration script to apply, using a computer, an optimization process and randomization factor to select the item to fill the next slot of the test while controlling statistical properties of the text based on the interim score and properties of the items within the item collection associated with each of the plurality of slots; and
   repeating the steps of obtaining the interim test score and applying the optimization process until the test has been completely assembled and administered to the examinee;
   wherein execution of the test administration script ensures the test meets a content specification while reducing the computational load required to assemble the test.

5. A computer-assisted method of test assembly for assembling a computer-based test comprised of a plurality of slots to be filled by test items having the advantages of ensuring the test will meet all content specifications, reducing the computational load required to assemble the test, and protecting against over-usage of test items, the computer-assisted method comprising:
   providing a plurality of item collections, each of the plurality of item collections comprising a plurality of test items;

executing a test administration script to associate each of the plurality of slots of the test with one of the plurality of item collections from which an item to fill the slot is to be chosen and to identify a lookup table of optimization statistics and a degree of randomization for each slot to use in selecting an item from the one of the plurality of item collections, the one of the plurality of item collections including a plurality of eligible test items that meet the content specifications for that slot of the test, and wherein the test administration script comprises a plurality of instruction sets, one of the instruction sets associated with one of the plurality of slots;

obtaining an interim test score based on examinee responses to a portion of the test previously assembled and administered to an examinee;

further executing the test administration script to select, using a computer, the item to fill the slot from the one of the plurality of item collections based upon optimization statistics and a degree of randomization; and repeating the steps of obtaining the interim test score and selecting the item to fill the slot until the test has been completely assembled and administered to the examinee.

6. The computer-assisted method of claim 5 wherein the step of obtaining an interim score includes assigning an initial score as the interim score for a first of the plurality of slots.

7. The computer-assisted method of claim 5 wherein the test is a computer-adaptive test.

8. The computer-assisted method of claim 5 wherein the optimization statistics are associated with a level of difficulty determined from the interim test score.

9. A system of scripted testing for assembling a test comprised of a plurality of slots, the system comprising:

a plurality of item collections stored on a computer readable medium;

a set of at least one lookup table of optimization statistics stored on the computer readable medium and an associated optimization function;

at least one item and test scoring routine stored on the computer readable medium;

a test administration script stored on the computer readable medium, the test administration script comprising a plurality of instruction sets, one of the instruction sets associated with one of the plurality of slots, each of the instruction sets identifying for an associated slot an item collection containing a plurality of items that meet the content specifications for that slot and from which the item for that slot is to be chosen, and the lookup table and degree of randomization to be employed in the selection of the item;

wherein execution of the test administration script ensures that test specifications for the test are met.

10. The system of claim 9 wherein the test administration script is executed during administration of a computer-based test.

11. The system of claim 9 wherein the test administration script is executed to assemble the test prior to the administration of the test.

12. The system of claim 9 wherein the step of obtaining an interim score includes assigning an initial score as the interim score for the first of the plurality of slots.

13. The system of claim 9 wherein the optimization statistics are associated with a level of difficulty determined from the interim test score.

14. A computer-assisted method of test assembly for assembling a computer-based test comprised of a plurality of slots to be filled by test items, the method having the advantage of ensuring the test will meet all content specifications while reducing the computational load required to assemble the test, and the method comprising:

providing a plurality of item collections stored on a computer readable medium;

executing a test administration script to associate each of the plurality of slots of the test with one of the plurality of item collections from which an item to fill the slot is to be selected, the one of the plurality of item collections including only eligible test items that meet the content specifications for the slot, and wherein the test administration script comprises a plurality of instruction sets, one of the instruction sets associated with one of the plurality of slots;

obtaining an interim test score based on examinee responses to a portion of the test previously assembled and administered to an examinee;

further executing the test administration script to apply, using a computer, an optimization process and randomization factor to select the item to fill the slot while controlling statistical properties of the test based on the interim score and properties of the items within the item collection associated with each of the plurality of slots; and repeating the steps of obtaining the interim test score and applying the optimization process until the test is completely assembled and administered.

15. The computer-assisted method of claim 14 wherein the step of obtaining an interim score includes assigning an initial score as the interim score for a first of the plurality of slots.

16. The computer-assisted method of claim 14 wherein the test is a computer adaptive test.

17. An article of software stored on a non-transitory computer readable storage medium comprising instructions for performing a method of test assembly for assembling a computer-based test comprised of a plurality of slots to be filled by test items, the method having the advantage of ensuring the test will meet all content specifications while reducing the computational load required to assemble the test, and the method comprising:

providing a plurality of item collections stored on a computer readable medium;

execution a test administration script to associate each of the plurality of slots of the test with one of the plurality of item collections from which an item to fill the slot is to be selected, the one of the plurality of item collections including only eligible test items that meet the content specifications for the slot, and wherein the test administration script comprises a plurality of instruction sets, one of the instruction sets associated with one of the plurality of slots;

obtaining an interim test score based on examinee responses to a portion of the test previously assembled and administered to an examinee;

further executing the test administration script to apply, using a computer, an optimization process and randomization factor to select the item to fill the slot with controlling statistical properties of the test based on the interim score and properties of the items within the item collection associated with each of the plurality of slots; and repeating the steps of obtaining the interim test score and applying the optimization process until the test is completely assembled and administered.

18. The article of software of claim 17 wherein one of the plurality of instructions sets is the same as another of the plurality of instruction sets.

* * * * *

UNITED STATES PATENT AND TRADEMARK OFFICE
CERTIFICATE OF CORRECTION

PATENT NO.        : 8,834,173 B2                                                                Page 1 of 1
APPLICATION NO.   : 11/102016
DATED             : September 16, 2014
INVENTOR(S)       : McKinley et al.

It is certified that error appears in the above-identified patent and that said Letters Patent is hereby corrected as shown below:

In the Claims

Col. 10, Claim 4, Line 32:
DELETE after each "or"
ADD after each --of--

Col. 10, Claim 4, Line 46:
DELETE after the "text"
ADD after the --test--

Col. 12, Claim 17, Line 43:
DELETE before a test "execution"
ADD before a test --executing--

Signed and Sealed this
Second Day of December, 2014

Michelle K. Lee
*Deputy Director of the United States Patent and Trademark Office*